Figure 1:
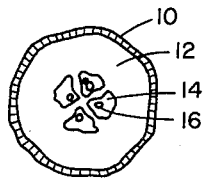

Oct. 10, 1961  E. E. ANDERSON ET AL  3,003,881
FOOD PROCESS
Filed July 14, 1960

WITHOUT TEMPERATURE CYCLING

AS PICKED

ONE WEEK AT 0°F

26 WEEKS AT 0°F

WITH TEMPERATURE CYCLING

AS PICKED

ONE DAY 0°F;
ONE DAY 40°F
ONE CYCLE

ONE DAY 0°F;
ONE DAY 40°F
TWO CYCLES

INVENTORS
Edward E. Anderson
Carol P. Nelson
William F. Hampton

BY
Attorney

United States Patent Office 3,003,881
Patented Oct. 10, 1961

3,003,881
FOOD PROCESS
Edward E. Anderson, Lexington, Carol P. Nelson, Boston, and William F. Hampton, South Duxbury, Mass., assignors, by direct and mesne assignments, to Ocean Spray Cranberries, Inc., Hanson, Mass., a corporation of Delaware
Filed July 14, 1960, Ser. No. 42,852
2 Claims. (Cl. 99—105)

This invention relates to a food product and more particularly to a process for treating cranberries.

One of the forms in which cranberries are now marketed is as a sweetened, diluted juice, or more popularly as so-called cranberry juice cocktail. Because of the nature of the cranberries and the manner in which they are formed in growing, they are not suitable for pressing after picking to make a juice which has an acceptably dark color or full flavor. A fresh cranberry when sectioned midway between its stem and blossom ends shows it to have a skin and a few layers of cells of intense red color, the remaining internal portion of the cranberry (excluding the seeds) being nearly white or light yellow. When cranberries which have just been picked, or which have been stored at temperatures of 36° F. or above, are pressed to yield juice the color of the resulting juice is a pale pink, the yield is low and the taste does not include the full cranberry flavor. With prolonged storage under certain refrigeration conditions (usually 0° F.±10° F.) the color from the outer cellular layers associated with the skin gradually migrates and, after thawing these berries, the color uniformly penetrates the entire berry at which point it is red throughout.

In making cranberry juice it has been customary to store the cranberries under various commercial refrigeration conditions until this color migration had been completed. Storage was required for about three months and very often the cranberries were stored for more than twelve months. These extended periods required to achieve color migration necessitate incurring additional costs for storing the berries until they can be made into juice. Because refrigerated storage was necessary, the cranberries could not be processed until a minimum storage period had passed. Moreover, prolonged periods of storage result in loss of flavor and aroma. Desiccation of the berries continues throughout the storage period and thus causes progressive losses in juice yields.

It is apparent then that it would be desirable to have available a process by which cranberries could be treated to cause the color migration to take place rapidly and when desired.

It is therefore an object of this invention to provide a process by which cranberries can be treated to cause color migration to be effected within the berries in as little as two days. It is another object of this invention to provide a process of the character described which may be carried out at any desired time and which may therefore be available to control the changing of the cranberries to a form in which they may be economically converted to juice. Yet another object is to provide a process for treating cranberries which are to be converted to juice, which avoids undue desiccation of the berries and hence permits maximizing the juice yield. Still another object is to provide a process of the character described which effects economies in refrigeration costs and times and which produces a cranberry juice having improved flavor and aroma. These and other objects will become apparent in the following description of this invention.

Cranberries according to this invention are treated by a process which is characterized by alternately freezing the cranberries at about 0° F. and thawing them at about 40° F. until the individual cranberries are substantially uniformly colored throughout.

If cranberries are pressed before uniform color development has been achieved, i.e., before the red coloration of the skin has migrated and penetrated throughout the berries, the resulting juice is a light pink in color and low in yield. Thus it appears that it is necessary to achieve color development before acceptable cranberry juice can be made. Although it is not completely understood why this is necessary and what the actual mechanism of color development and migration is, it has been found that in order to formulate a juice having a pleasing dark red color and a full cranberry aroma and taste, it is necessary for the entire cranberry to turn red. The process of this invention discloses a way of achieving this necessary color development very rapidly thus making it possible to condition berries for juice manufacture at any desired time either immediately after picking or within approximately two days after removal from storage.

Figure 2:
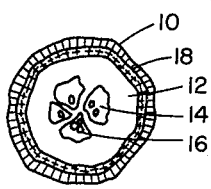
Figure 3:
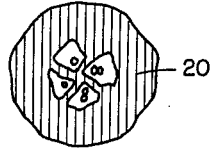
Figure 4:
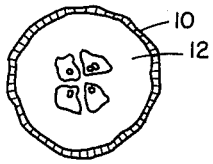
Figure 5:
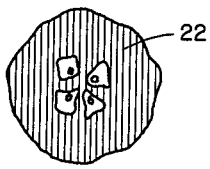
Figure 6:
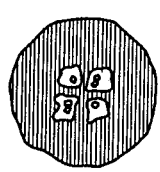

The process of this invention may be further described with reference to the accompanying drawings in which:

FIGS. 1-3 illustrate color development in berries stored in accordance with the prior art process; and FIGS. 4-6 illustrate the color development of cranberries processed in accordance with this invention.

In the drawings, cross-sections of single cranberries are shown in greatly enlarged form. These cross-sections are taken midway between the stem and blossom ends of the berries. A typical cranberry directly after picking will have a cross-section similar to that illustrated in FIG. 1. The very thin skin and closely associated cell layers 10 of the cranberry will be red; while the remaining portion 12 is white or light yellow. Also within the cranberry is a hollow space 14 in which are located seeds 16. In the process of color development the cranberry gradually turns red from the outside in. In FIG. 2 there is shown a cross-section of a cranberry which has been maintained at 0° F. for a period of one week. In this case the outside red ring 10 has begun to migrate and there is within this a second ring 18 which is a deep orange in color. It will, of course, be appreciated that the red coloration actually blends into the orange and that there is not a sharp dividing line between the red and orange rings. Finally, after 26 weeks of commercial storage at 0° F. the entire meat 20 of the cranberry usually has become red as indicated in FIG. 3.

In contrast to the behavior of the cranberries stored continuously at 0° F. is the rapid color development of berries which are alternately cycled between 0° F. and 40° F. The color development of a typical batch of cranberries treated in accordance with the process of this invention is illustrated diagrammatically in FIGS. 4-6. In FIG. 4, as in the case of FIG. 1, the figure represents a cross-section of a single berry as picked. FIG. 5 shows the extent of the color migration when cranberries have been cycled, in this case maintained for one day at 0° F., and then maintained for another day at 40° F. It will be seen from FIG. 5 that after one overall cycle (equivalent to two days' treatment) the entire berry 22 has become red. The intensity of the red coloration of the berry of FIG. 5 was greater than that of the berry of FIG. 3 which had been stored for 26 weeks under normal conditions. This has been indicated in FIG. 5 by drawing the cross-hatching lines closer together in FIG. 5.

After two cycles the red of the berry has intensified as shown in FIG. 6 by the lines which are drawn even closer together to indicate a deeper color. At this point the berry may be described as a deep crimson and juice which is made from it is also of a deep crimson color. The resulting juice has a full cranberry flavor and is equivalent to or even higher in cranberry flavor than berries which have been stored at 0° F. for six months or longer.

In treating cranberries in accordance with the process of this invention it is, as pointed out above, necessary to subject the berries to a given temperature cycle. The temperature of the low end of the cycle should be about 0° F. or low enough to actually freeze the berries throughout to the point where they contain ice crystals. A lower temperature may be used, but it is not necessary as long as the berries become completely frozen. The upper end of the temperature cycle is that which will bring about complete thawing of the berries, e.g., about 40° F. Higher temperatures may be used, but in any event this upper temperature, and the time of dwell there, should be such as to prevent any undue enzymatic or microbial activity from degrading the quality of the berries. Although it is preferable to permit the berries to remain at each of these two temperatures for at least twenty hours, it is only necessary to bring the individual berries throughout their cross-section into equilibrium with the temperatures. A dwell period at either temperature is in fact unnecessary, although it is preferred for attainment of maximum color and flavor.

As illustrated in FIG. 5 one complete cycle from freezing to thawing produces a saisfactory berry for juice manufacture. However, in order to obtain the very pleasing dark crimson color of the juice it is necessary to submit the cranberries to at least two cycles and if desired to as many as four of these cycles. Although multiple cycles may be used beyond this number, it is generally not economically feasible to do so.

The process of this invention, which is applicable to all common varieties of cranberries, will be further described in the following examples which are meant to be illustrative and not limiting. In evaluating the berries in terms of their acceptability for making juice, the juice was extracted from 350 grams of the cranberries by means of a Carver press. The extraction was accomplished by using a pressing time of two minutes at 2000 p.s.i. followed by two minutes at 4000 p.s.i. The resulting juice was then weighed to determine percent yield based on the original weight and also was evaluated for color, flavor and aroma.

*Example I*

Fresh cranberries of the Early Black variety were stored at 0° F. for 24 hours. Under these conditions the entire cross-sections of the cranberries were frozen and ice crystals were formed. Then the berries were stored for 24 hours at 40° F. When individual berries were sectioned, they were found to be a dark red throughout as illustrated in FIG. 5 discussed above. The extracted juice had a dark red color and pleasing full-cranberry flavor and aroma. The yield of juice was 72% of the total cranberry weight.

To compare the effectiveness of this process for treating cranberries with no treatment and with normal cold storage treatment, equal quantities of fresh Howe berries and of Howe berries which had been kept in commercial cold storage at 40° F. were treated to extract juice therefrom by the standardized process described above.

Juice yield from the fresh berries was 43% and the resulting juice was light pink in color and had an immature and unblended cranberry flavor and aroma. Juice yield from the cold storage cranberries was 42% and the juice which was light pink in color did not possess the full flavor and aroma of the juice made from the cranberries treated in accordance with this invention.

*Example II*

Early Black cranberries when continuously stored at 40° F. (commercial storage temperature) yielded 42% juice. After freezing at 0° F. for 24 hours, the yield increased to 75%. Alternating the storage from 40° F. to 0° F. every 24 hours for a three-day period gave a yield of 74%. During the seven-week storage period the Early Blacks stored at 0° F. yielded from 75 to 78% juice.

The Howe cranberries when continuously stored at 40° F. yielded 37% juice, and then after being frozen at 0° F. for 24 hours yielded 77%. Alternating the storage between 0° F. and 40° F. every 24 hours for three days gave a yield of 75%. The Howes stored at 0° F. for a seven-week period gave yields varying from 75 to 79%. When alternated between storage at 0° F. for six days and 40° F. for one day over a seven-week period, the Howes yielded from 76 to 79% juice.

The color of juices made from both types of berries which had been stored only at 40° F. or above was light pink. After freezing at 0° F. for one day, the color of the juices was light red, but after the berries returned to 40° F. for 24 hours, the color became a dark red. An additional 24-hour storage at 0° F. produced a juice of a similar dark red color. Howe cranberries stored at 0° F. produced a dark red colored juice after one week's storage, but the Howe cranberries alternated between six days at 0° F. and one day at 40° F. produced a deeper red colored juice after this time, and a very deep crimson colored juice after two weeks. The Early Blacks stored continually at 0° F. for seven week consistently produced a deep red colored juice which was darker than the Howes stored continuously at 0° F. but not as dark as the Howes alternated between six days at 0° F. and one day at 40° F. Thus, by processing the normally lighter colored Howe berries in accordance with this invention they made a juice which compared favorably with that from the darker Early Blacks.

It will be seen that by the process of this invention any of the commonly known varieties of cranberries can be treated to make them suitable for converting to juice of a superior color, taste and aroma. The process moreover makes it possible to convert cranberries to juice any time after picking, thus eliminating the normal storage period which may be uneconomical both with respect to storage costs and loss in juice yield.

We claim:

1. Process for treating cranberries to make them suitable for converting to juice, characterized by the step of alternating the temperature of cranberries between about 0° F. and about 40° F., thereby to subject them to temperature cycles the number of said cycles being at least two.

2. Process for treating cranberries to make them suitable for converting to juice, characterized by the step of alternating the temperature of cranberries between about 0° F. and about 40° F., thereby to subject them to temperature cycles, the number of said cycles being at least two, and the time at which said cranberries are maintained at any one temperature being about 20 hours.

No references cited.